United States Patent
Abe et al.

(10) Patent No.: US 9,313,652 B2
(45) Date of Patent: Apr. 12, 2016

(54) RADIO BASE STATION, MOBILE STATION, COMMUNICATION CONTROLLER, AND COMMUNICATION CONTROL METHOD

(75) Inventors: Tetsushi Abe, Chiyoda-ku (JP); Mikio Iwamura, Chiyoda-ku (JP); Kazuaki Takeda, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 191 days.

(21) Appl. No.: 14/112,170

(22) PCT Filed: Mar. 6, 2012

(86) PCT No.: PCT/JP2012/055687
§ 371 (c)(1),
(2), (4) Date: Oct. 16, 2013

(87) PCT Pub. No.: WO2012/150668
PCT Pub. Date: Nov. 8, 2012

(65) Prior Publication Data
US 2014/0045497 A1     Feb. 13, 2014

(30) Foreign Application Priority Data

May 2, 2011   (JP) .................................. 2011-103303
May 9, 2011   (JP) .................................. 2011-104655

(51) Int. Cl.
*H04W 4/00*     (2009.01)
*H04W 8/24*     (2009.01)
*H04L 1/00*     (2006.01)

(52) U.S. Cl.
CPC ............... *H04W 8/24* (2013.01); *H04L 1/0067* (2013.01)

(58) Field of Classification Search
CPC .................................................. H04W 64/00
USPC .......................................... 455/435.1, 435.2
See application file for complete search history.

(56) References Cited

U.S. PATENT DOCUMENTS

2010/0135208 A1   6/2010   Ishii et al.
2014/0369308 A1*  12/2014  Gerstenberger et al. ...... 370/329

FOREIGN PATENT DOCUMENTS

JP    2009 224972    10/2009
WO    2008 136294    11/2008

OTHER PUBLICATIONS

"LS on Rel-10 UE category" RAN WG1, 3GPP TSG RAN WG1 Meeting # 62 R1-105095, pp. 1-4, (Aug. 23, 2010).
"Soft Buffer Allocation for CA", NTT DOCOMO, 3GPP TSG RAN WG1 Meeting #64 R1-110860, pp. 1-11, (Feb. 21, 2011).
$3^{rd}$ Generation Partnership Project; Technical Specification Group Radio Access Network; Evolved Universal Terrestrial Radio Access (E-UTRA); User Equipment (UE) radio access capabilities (Release 10), 3GPP TS 36.306 vol. 10.1.0, (Mar. 2011).
Japanese Office Action Issued May 7, 2013 in JP 2011-104655 Filed in May 9, 2011(with English translation).
International Search Report Issued May 15, 2012 in PCT/JP12/55687 Filed Mar. 6, 2012.

* cited by examiner

*Primary Examiner* — Temica M Beamer
(74) *Attorney, Agent, or Firm* — Oblon, McClelland, Maier & Neustadt, L.L.P.

(57) ABSTRACT

A radio base station includes: a category acquisition unit configured to acquire one or more mobile station categories indicating capability of a mobile station with which to communicate; a category determination unit configured to determine a mobile station category to be applied to radio communications with the mobile station from the mobile station categories acquired by the category acquisition unit to correspond to one of parameters to be used in rate matching processing of the mobile station; and a category notification unit configured to notify the mobile station of the mobile station category determined by the category determination unit.

10 Claims, 6 Drawing Sheets

FIG. 6

| UE CATEGORY | MAXIMUM DATA RATE (DL/UL) | DL | | | |
|---|---|---|---|---|---|
| | | MAXIMUM NUMBER OF DL-SCH TB BITS (per TTI) | MAXIMUM NUMBER OF DL-SCH BITS (per TB) (per TTI) | TOTAL NUMBER OF SOFT CHANNEL BITS | MAXIMUM SPATIAL LAYER COUNT |
| CATEGORY 1 | 10 Mbps/ 5 Mbps | 10296 | 10296 | 250368 | 1 |
| CATEGORY 2 | 50 Mbps/ 25 Mbps | 51024 | 51024 | 1237248 | 2 |
| CATEGORY 3 | 100 Mbps/ 50 Mbps | 102048 | 75376 | 1237248 | 2 |
| CATEGORY 4 | 150 Mbps/ 50 Mbps | 150752 | 75376 | 1827072 | 2 |
| CATEGORY 5 | 300 Mbps/ 75 Mbps | 299552 | 149776 | 3667200 | 4 |
| CATEGORY 6 | 300 Mbps/ 50 Mbps | 301504 | 149776* 75376** | 3667200 | NA |
| CATEGORY 7 | 300 Mbps/ 100 Mbps | 301504 | 149776* 75376** | 3667200 | NA |
| CATEGORY 8 | 3000 Mbps/ 1500 Mbps | 2998560 | 299856 (8 LAYERS) | 35982720 | NA |

FIG. 7
(a)
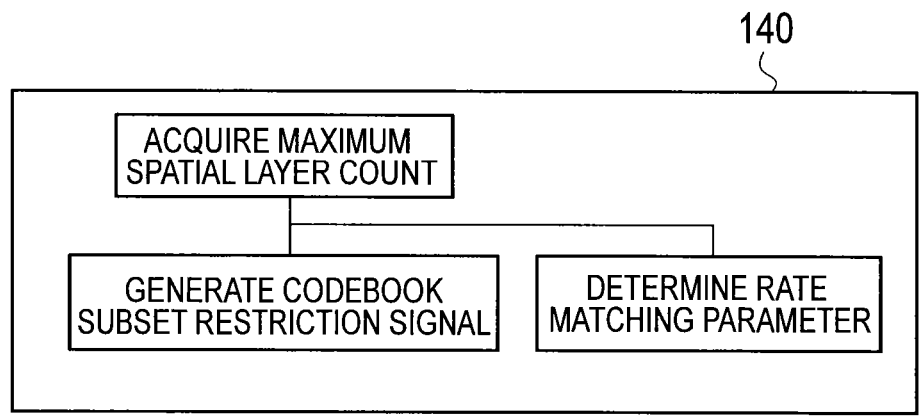
(b)
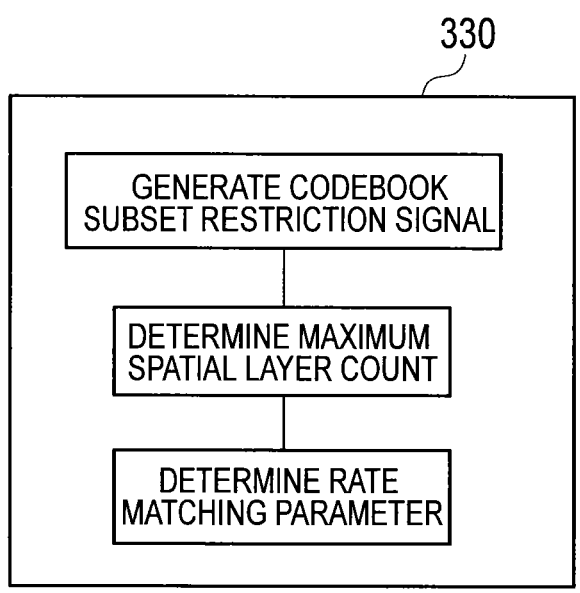

RADIO BASE STATION, MOBILE STATION, COMMUNICATION CONTROLLER, AND COMMUNICATION CONTROL METHOD

TECHNICAL FIELD

The present invention relates to a radio base station configured to perform radio communications based on a mobile station category, a mobile station, a communication controller, and a communication control method.

BACKGROUND ART

In the 3rd Generation Partnership Project (3GPP), provisions of LTE-Advanced (Release 10, for example) which have been further evolved from the radio access scheme of Long Term Evolution (LTE) is under study.

For example, in Release 10 of LTE, eight mobile station (UE) categories (UE categories 1 to 8) according to communication rates in downlink and uplink are provided (see Non-Patent Document 1, for example). On the other hand, in Releases earlier than Release 10, specifically in Releases 8 and 9, five UE categories (UE categories 1 to 5) are provided. In other words, UE categories 6 to 8 which can achieve faster communication rates than UE categories 1 to 5 have been added to Release 10.

It is provided that a mobile station supporting UE categories 6 to 8 notifies a radio base station (eNB) of both UE categories (1 to 5) in Releases 8, 9 and UE categories (6 to 8) which have been added in Release 10. This enables the radio base station to perform radio communications with a mobile station even if the radio base station does not support Release 10.

Further, for soft buffer size (Total num. of soft channel bits) which a mobile station should be equipped with, a different value is provided for each UE category from the standpoint of ensuring throughput.

PRIOR ART DOCUMENT

Non-Patent Document

Non-patent document 1: 3GPP TS 36.306 V10.1.0, 3rd Generation Partnership Project; Technical Specification Group Radio Access Network; Evolved Universal Terrestrial Radio Access (E-UTRA); User Equipment (UE) radio access capabilities (Release 10), March 2011

SUMMARY OF THE INVENTION

However, the contents of the above-mentioned provisions have the following problem. Specifically, after notifying a radio base station of both UE categories (1 to 5) in Releases 8, 9 and UE categories (6 to 8) added in Release 10, a mobile station supporting the UE categories 6 to 8 cannot recognize a UE category determined depending on capability of the radio base station. Thus, unless UE categories match between the mobile station and the radio base station, the mobile station cannot correctly demodulate user data from a radio signal received from the radio base station.

Specifically, since soft buffer size (Total num. of soft channel bits) differs for each UE category, a method of rate matching for adjusting the number of transmitted bits by adding or deleting a part of bits after channel encoding differs for each UE category. More specifically, in downlink, for example, a mobile station cannot correctly decode user data from a radio signal received from a radio base station unless the mobile station recognizes a UE category based on which it connects to the radio base station at a connection destination.

Hence, the present invention has been made in light of the circumstances, and an objective of the present invention is to provide a radio base station, a mobile station, a communication controller and a communication control method which can correctly demodulate user data even if a method of rate matching differs for each mobile station category.

A first characteristic of the present invention is summarized in that it is a radio base station (an eNB100A, for example) including: a category acquisition unit (a category acquisition unit 130) configured to acquire one or more mobile station categories (UE categories 1 to 8, for example) indicating capability of a mobile station (UE300) with which to communicate; a category determination unit (a category determination unit 140) configured to determine a mobile station category to be applied to radio communications with the mobile station, from the mobile station categories acquired by the category acquisition unit, to correspond with one of parameters to be used in rate matching processing of the mobile station; and a category notification unit (a category notification unit 150) configured to notify the mobile station of the mobile station category determined by the category determination unit.

A second characteristic of the present invention is summarized as a mobile station (UE300) configured to perform radio communications with a radio base station (an eNB100A, for example) based on any mobile station category determined from a plurality of mobile station categories (UE categories 1 to 8, for example), the mobile station including a category determination unit (a category determination unit 330) configured to determine a predetermined mobile station category from candidates for the mobile station categories of which the mobile station notified the radio base station, as a mobile station category to be applied to radio communications with the radio base station, for a period till the mobile station is notified of the mobile station category by the radio base station.

A third characteristic of the present invention is summarized as a mobile station configured to perform radio communications with a radio base station based on any mobile station category determined from a plurality of mobile station categories, the mobile station including a category determination unit configured to determine a parameter of rate matching to be applied to radio communications with the radio base station, and to determine a mobile station category which uses the determined parameter, as a mobile station category to be applied to the radio communications with the radio base station.

A fourth characteristic of the present invention is summarized as a mobile station configured to perform radio communications with a radio base station based on any of mobile station categories determined from a plurality of mobile station categories, the mobile station applying, to radio communications with the radio base station, a parameter of rate matching of a mobile station category supporting Release of standards of the radio communications which define a control signal notifying a transmission mode of the radio communications.

A fifth characteristic of the present invention is summarized in that it is a communication controller (an MME200) including: a category acquisition unit configured to acquire one or more mobile station categories indicating capability of a mobile station with which to communicate; a category determination unit configured to determine a mobile station category to be applied to radio communications with the mobile station, from mobile station categories acquired by the category acquisition unit, to correspond with one of parameters to be used in rate matching processing of the mobile station; and a category notification unit configured to notify the mobile station of the mobile station category determined by the category determination unit.

A sixth characteristic is summarized in that it is a communication control method including the steps of: acquiring one or more mobile station categories indicating capability of a mobile station with which to communicate; determining a mobile station category to be applied to radio communications with the mobile station, from the acquired mobile station categories, to correspond with one of parameters to be used in rate matching processing of the mobile station; and notifying the mobile station of the determined mobile station category.

BRIEF DESCRIPTION OF THE DRAWINGS

FIG. 6 is a view showing one example of specifications of a UE category according to an embodiment of the present invention.

FIG. 7 is a view showing a functional block configuration of a category determination unit 140 of an eNB100A and a functional block configuration of a category determination unit 330 of UE300, according to a modification of the present invention.

MODE FOR CARRYING OUT THE INVENTION

In the following, embodiments of the present invention will be described. Note that same or similar numerals are assigned to same or similar parts in the description of drawings shown below. It should be noted, however, that the drawings are schematic and that proportions in each dimension differ from those in reality.

Thus, specific dimensions and the like should be determined in consideration of the following description. Further, it is needless to say that parts whose mutual dimensional relationship or ratio is different are also included.

(1) Overall Schematic Configuration of Mobile Communication System

Figure 1:
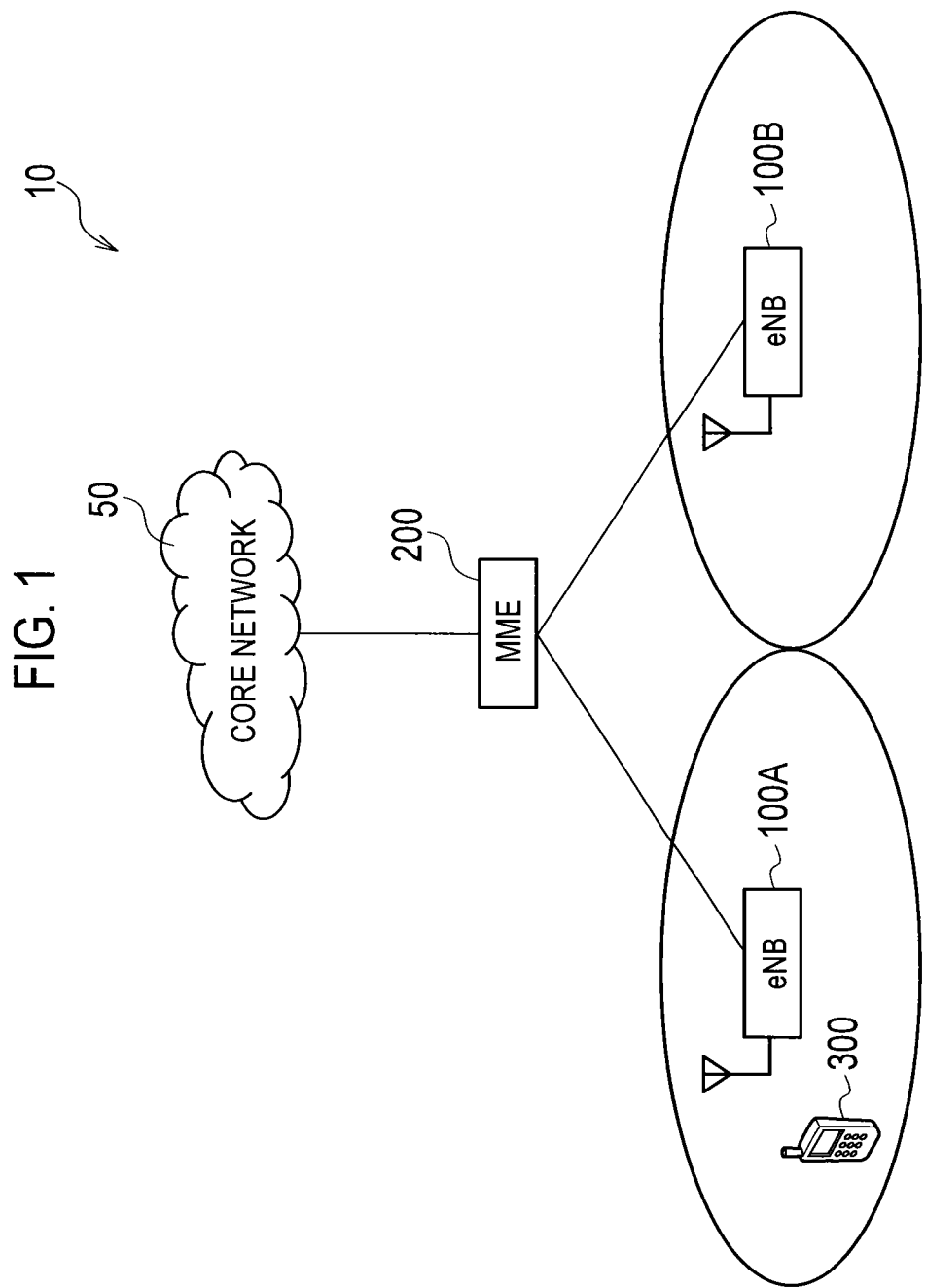
FIG. 1 is an overall schematic configuration diagram of a mobile communication system 10 according to an embodiment of the present invention.

FIG. 1 is an overall schematic configuration diagram of a mobile communication system 10 according to the embodiment. As shown in FIG. 1, the mobile communication system 10 includes a core network 50, radio base stations 100A, 100B (eNB100A, 100B), Mobility Management Equipment 200 (an MME200), and a mobile station 300 (UE300).

In this embodiment, the mobile communication system 10 adopts a radio access scheme of Long Term Evolution (LTE). In the mobile communication system 10, a plurality of mobile station (UE) categories can be used, and based on any UE category determined from the plurality of UE categories, UE300 and the eNB100A, 100B perform radio communications. Details of the UE categories will be described hereinafter.

Note that in the following, for convenience of description, a term Release 8, 9, or 10 will be used. It is needless to say that the present invention can still be applied if Release N, N+1, M (M>N) replaces Release 8, 9, or 10.

The core network 50 is a wired communication network to which an MME200 or other communication device (e.g., Serving Gateway) is connected.

The eNB100A, 100B are a radio base station which complies with the Release 8, 9 of LTE or Release 10 (LTE-Advanced). The eNB100A, 100B perform radio communications with the UE300 based on a radio access scheme supported by the Release.

The MME200 is a device for managing mobility of the UE300, and controls the UE300 which performs radio communication with the eNB100A, 100B. In the embodiment, the MME200 comprises a communication controller positioned above the eNB100A, 100B.

The UE300 is a mobile station such as a mobile phone terminal or a data communication card and the like. The UE300 performs radio communications with the eNB100A, 100B, based on a UE category which corresponds with a support condition of the LTE Release of the eNB100A, 100B of the UE categories provided in the mobile communication system 10.

(2) Functional Block Configuration of Mobile Communication System

Figure 2:
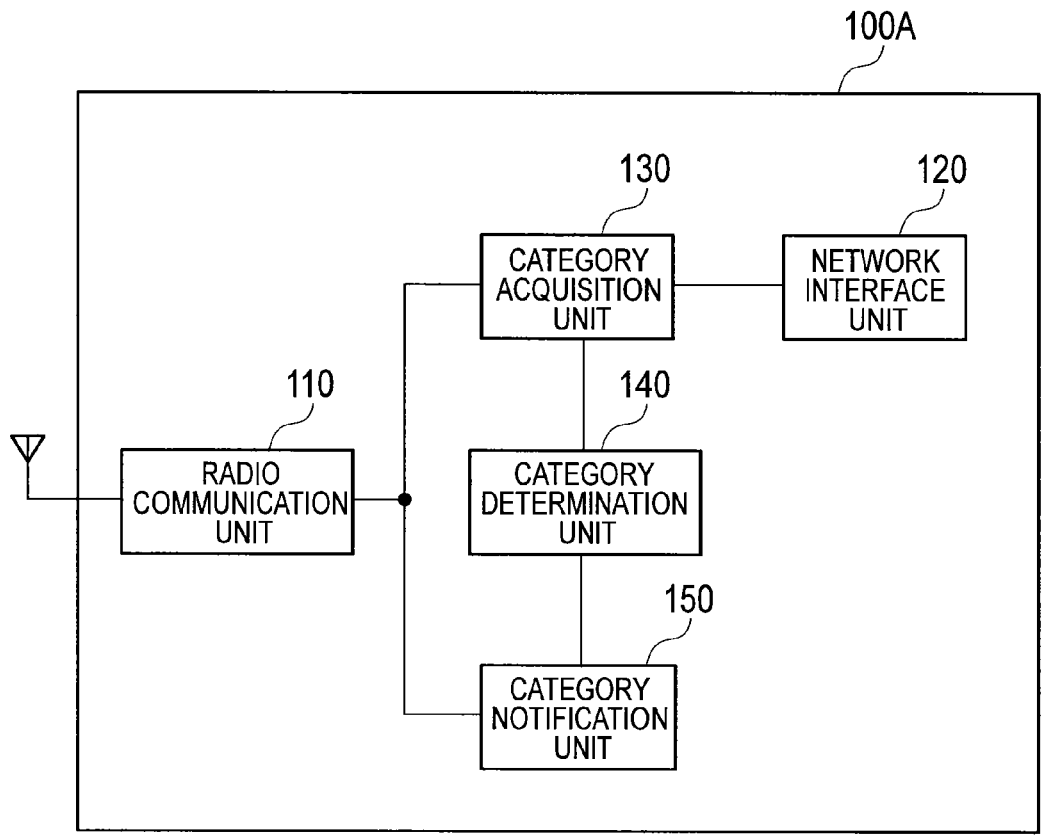
FIG. 2 is a functional block diagram of an eNB100A according to an embodiment of the present invention.
Figure 3:
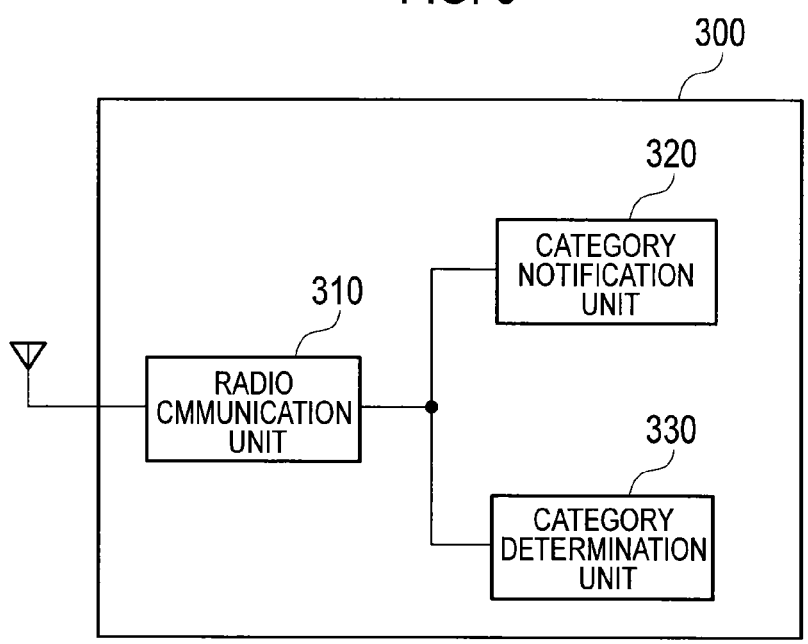
FIG. 3 is a functional block diagram of UE300 according to an embodiment of the present invention.

A functional block configuration of the mobile communication system 10 will be described hereinafter. Specifically, a functional block configuration of the eNB100A and the UE300 will be described. FIG. 2 is a functional block diagram of the eNB100A. FIG. 3 is a functional block diagram of the UE300.

(2.1) eNB100A

As shown in FIG. 2, the eNB100A includes a radio communication unit 110, a network interface unit 120, a category acquisition unit 130, a category determination unit 140, and a category notification unit 150. Note that the eNB100B also has a functional block configuration similar to the eNB100A.

The radio communication unit 110 performs processing related to radio communications with the UE300. For example, in downlink, the radio communication unit 110 performs such processing as channel encoding, rate matching, scrambling, modulation, and mapping to resource block of information bits.

Figure 5:
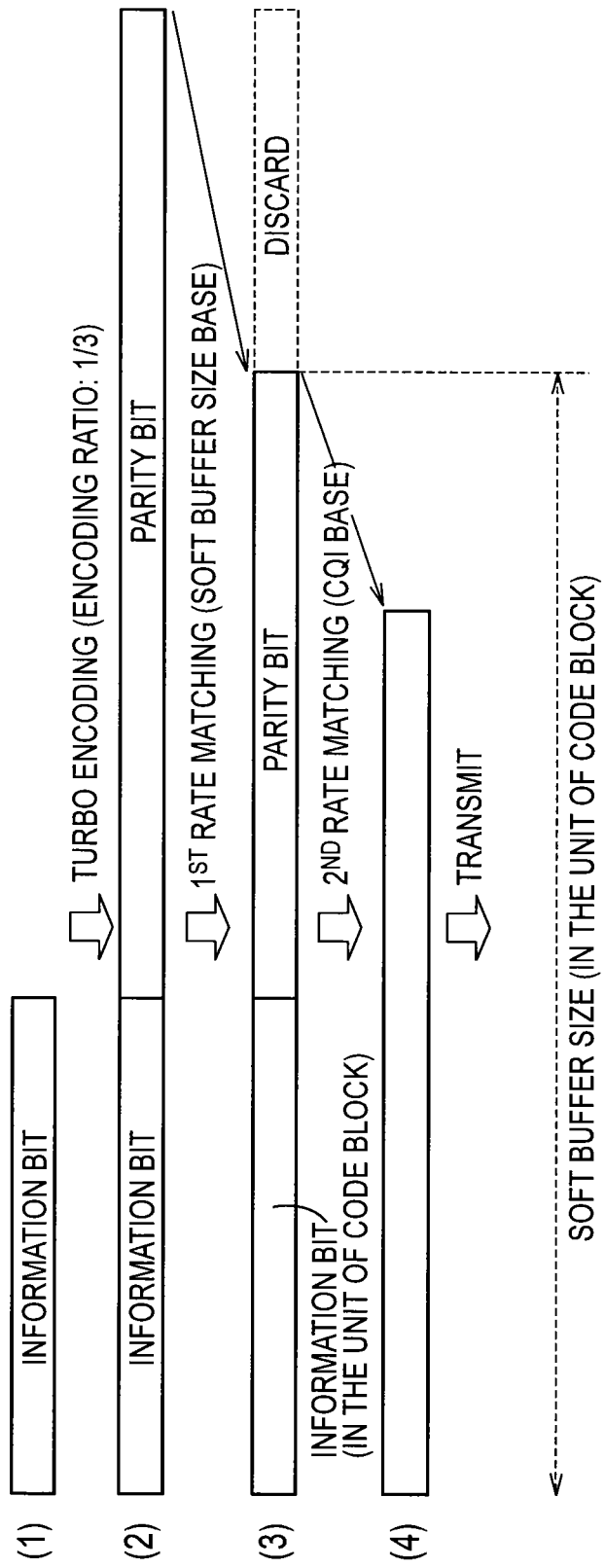
FIG. 5 is a view showing a concept of channel encoding and rate matching of information bits (user data) by an eNB100A according to an embodiment of the present invention.

Now, FIG. 5 shows a concept of channel encoding and rate matching of information bits (user data) by the eNB100A. As shown in FIG. 5, information bits are encoded (channel encoded) by turbo coding, and parity bits are added thereto ((2) in the figure). Then, first rate matching based on soft buffer size (Total num. of soft channel bits) is performed ((3) in the same). As such, through the rate matching which adjusts the number of transmitted bits by adding or deleting a part of the bits (information bits) after the channel encoding, the total bit number of the information bits and parity bits becomes equivalent to the soft buffer size in the unit of a code block.

Further, state of radio communications with UE300, Specifically, second rate matching based on Channel Quality Indicator (CQI) is performed ((4) in the same). This determines the number of transmitted bits corresponding with state of radio communications.

After performing the rate matching as shown in FIG. 5, the radio communication unit 110 further performs such processing as scrambling, modulation, and mapping to a resource block to transmit a radio signal to the UE300. The radio communication unit 110 also receives a radio signal transmitted by the UE300 and performs processing such as modulation of the information bits (user data).

The network interface unit 120 provides an interface necessary for transmission and reception of data by way of the core network 50. Specifically, the network interface unit 120 consists of a wired line LAN interface or a protocol stack such as TCP/IP and the like.

The category acquisition unit 130 acquires one or more UE categories (UE categories 1 to 8, for example) indicating capability of the mobile station (UE300) with which to communicate. Specifically, the category acquisition unit 130 acquires a UE category to be applied to radio communications between the UE300 and eNB100A. In this embodiment, the category acquisition unit 130 acquires one or more UE categories from the UE300 or MME200.

In the embodiment, as described above, the mobile communication system 10 complies with the Release 8, 9 of LTE or Release 10.

FIG. 6 shows one example of specifications of each UE category to be provided in Release 10 of LTE. As shown in FIG. 6, in Release 10 of LTE, a maximum data rate (downlink/uplink) is provided for each of the UE category 1 to 8. The UE categories 1 to 5 are also provided in the Release 8, 9 of LTE, and the UE categories 6 to 8 are the categories added in Release 10.

FIG. 6 also shows various parameters in the downlink (DL) of each UE category UE, Specifically, the maximum number of DL-SCH TB bits (Max. num. of DL-SCH TB bits per TTI), the maximum number of DL-SCH bits (Max. num. of DL-SCH bits per TB, per TTI), the total number of soft channel bits (Total num. of soft channel bits), and the maximum number of spatial layers (Max. num. of spatial layers). Note that a diagrammatic description of various types of parameters in the uplink (UL) is omitted in FIG. 6.

As shown in FIG. 6, in each UE category, in order to ensure throughput corresponding with the maximum data rate, the soft buffer size which the UE300 should be equipped with, specifically, the total number of soft channel bits (Total num. of soft channel bits) as shown in FIG. 6 differs. For this reason, a method of the above-mentioned rate matching (see FIG. 5) may differ depending on the total number of soft channel bits.

Specifically, unless the UE300 recognizes a UE category based on which it connects to the eNB100A at a connection destination, it cannot correctly demodulate user data from a radio signal received from the eNB100A. Thus, the UE300 needs to correctly recognize a UE category to be applied to radio communications with the eNB100A.

Further, the category acquisition unit 130 can acquire a plurality of candidates for mobile station categories to be applied to radio communications with the UE300, from the UE300 which connects to the eNB100A. In the embodiment, as described above, the mobile communication system 10 complies with the Release 8, 9 of LTE or Release 10.

Here, if the UE300 supports Release 10, specifically, if the UE300 supports the UE categories 6 to 8, the UE300 notifies the eNB100A of two UE categories, that is, any of the UE categories 1 to 5 supported in the Release 8, 9 and any of the UE categories 6 to 8 to be supported in Release 10. For example, the UE300 notifies the eNB100A of the UE category 5 and the UE category 6, depending on capability of the UE300.

The category acquisition unit 130 can acquire a plurality of candidates for mobile station categories to be thus notified by the UE300.

Alternatively, the category acquisition unit 130 can acquire a UE category from the MME200 if the UE300 has already performed radio communications with the eNB100A.

The category determination unit 140 determines a UE category to be applied to radio communications with the UE300, from the UE categories acquired by the category acquisition unit 130, so as to correspond with one of the parameters to be used in the rate matching processing of the UE300.

Specifically, the category determination unit 40 determines a UE category to be applied to radio communications with the UE300 based on the UE category which the category acquisition unit 130 acquired from the UE300 connected to the eNB100A. For example, when the category acquisition unit 130 acquires the UE category 5 notified by the UE300, the category determination unit 140 determines the UE category 5 as a UE category to be applied to radio communications with the UE300.

Alternatively, based on the UE category acquired from the MME200, the category determination unit 140 can determine a UE category to be applied to radio communications with the UE300. Specifically, if the category determination unit 140 already performs radio communications with the eNB100A, it can change the UE category (the UE category 5, for example) applied to the radio communications with the UE300 to a UE category (UE category 4) notified by the MME200, based on the UE category (the UE category 4, for example) notified by the MME200.

Further, based on the UE category notified by the category notification unit 150, the category determination unit 140 can determine, as a UE category to be applied to radio communications with the UE300, a predetermined UE category from candidates for the UE categories acquired by the category acquisition unit 130, for a period till the UE300 is notified of the UE category.

For example, if it is two UE category candidates of the UE category 5 and the UE category 6 that the category acquisition unit 130 acquires, the category determination unit 140 determines the UE category 5 whose category is lower than the UE category 6 as a UE category to be applied to radio communications with the UE300. Specifically, in the embodiment, a predetermined UE category is a UE category with the lowest capability (communication rate, for example) of the UE categories notified by the UE300.

Alternatively, the category determination unit 140 may determine to transmit data to the UE300 using transport block size (TBS) for which a method of rate matching is the same, among the candidates for UE categories acquired by the category acquisition unit 130 for a period till the eNB100A notifies the UE300 of a UE category, based on the UE category notified by the category notification unit 150. For example, the category determination unit 140 can use 301504 bits as the transport block size (TBS) for which a method of the rate matching is the same, of the UE categories shown in FIG. 6.

The category notification unit 150 notifies the UE300 of the UE category determined by the category determination unit 140. Specifically, the category notification unit 150 includes information indicating the determined UE category in "RRC CONNECTION RECONFIGURATION" transmitted from the eNB100A to the UE300.

(2.2) UE300

As shown in FIG. 3, the UE300 includes a radio communication unit 310, a category notification unit 320, and a category determination unit 330.

The radio communication unit 310 performs processing related to radio communications with the eNB100A (100B). Note that capabilities of the radio communication unit 310 differ from the above-mentioned radio communication unit 110 in detail since the radio access scheme (SC-FDMA) used in uplink differs from the radio access scheme (OFDM) used in downlink, but a detailed description is omitted here.

Similar to the radio communication unit 110, the radio communication unit 310 performs such processing as channel encoding, rate matching, scrambling, modulation, and mapping to a resource block of information bits, and the like.

The category notification unit 320 notifies the eNB100A of a UE category determined by the category determination unit 330. Specifically, the category notification unit 320 notifies the eNB100A to which the UE300 connects of a UE category to be applied to radio communications with the eNB100A. In particular, if the UE300 supports Release 10, the category notification unit 320 notifies the eNB100A of two UE categories of any of the UE categories 1 to 5 supported in the Release 8, 9 and any of the UE categories 6 to 8 supported in Release 10.

The category determination unit 330 determines a UE category to be applied to radio communications with the eNB100A. Specifically, the category determination unit 330 determines a UE category to be applied to radio communications with the eNB100A, depending on capability of the UE300.

Further, if the category determination unit 330 is notified of a UE category by the eNB100A, the category determination unit 330 determines, as a UE category to be applied to radio communications with the UE300, a predetermined UE category from the UE category candidates notified to the eNB100A by the category notification unit 320, for a period till a UE category is notified by the eNB100A based on a UE category notified by the eNB100A.

Such an action is similar to the category determination unit 140 described above. If the UE category candidates notified to the eNB100A are two UE categories of UE category 5 and UE category 6, the category determination unit 330 determines the UE category 5, whose category is lower than that of the UE category 6, as a UE category to be applied to radio communications with the eNB100A.

Further, if eNB100A does not support Release 10, category information indicating the UE category may not be notified to the UE300 by the eNB100A. Also in this case, the UE300 determines the lower UE category as the UE category to be applied to radio communications.

In addition, if in the future the UE300 notifies a network of three or more UE categories by way of the eNB100A, it may define a UE category to work as a default in release information. The UE category defined in Release 8 may be defined as a default.

(3) Operation of Mobile Communication System

Figure 4:
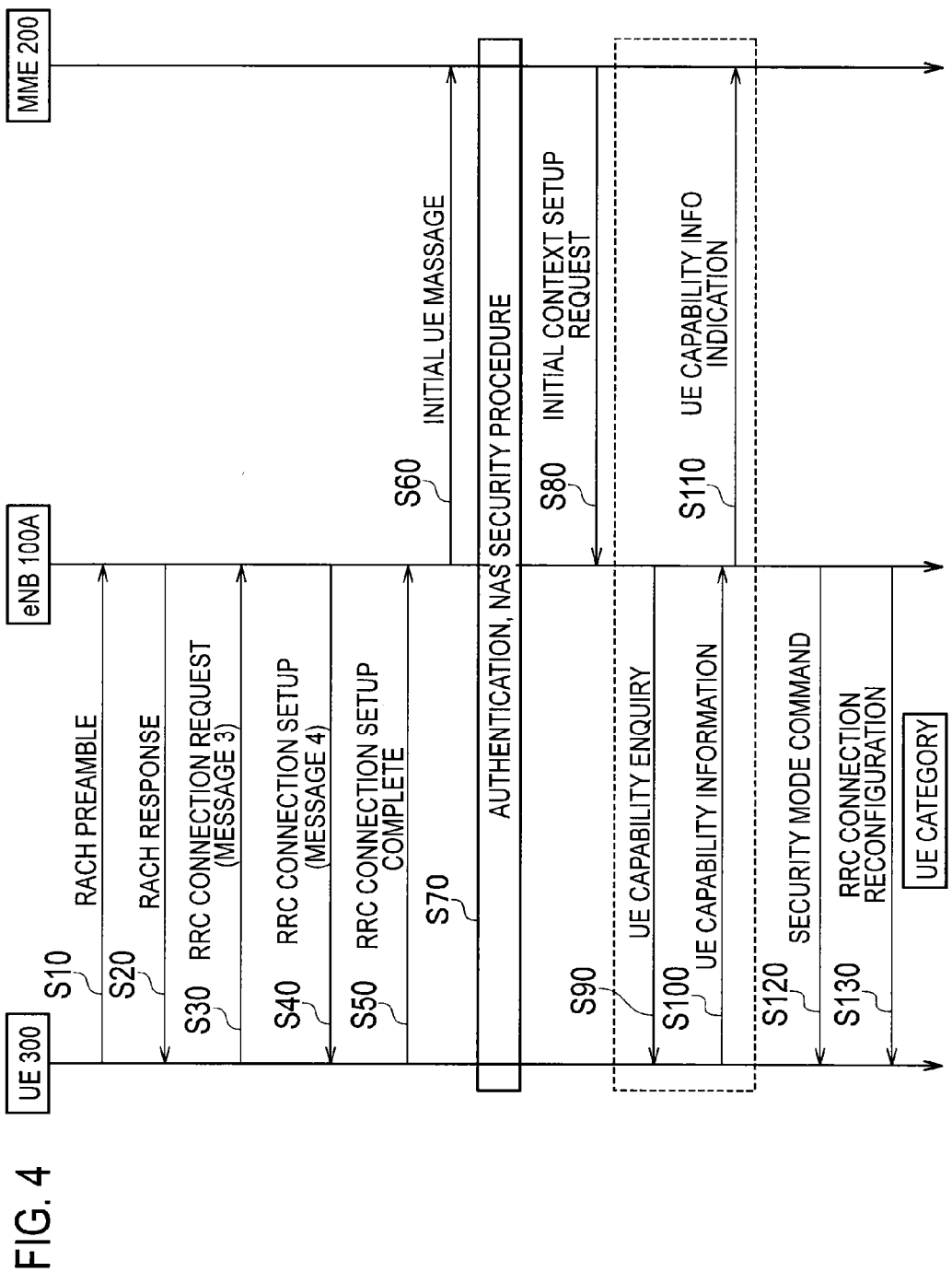
FIG. 4 is a view showing a communication sequence till UE300 and an eNB100A establish radio communications among UE300, the eNB100A, and an MME200 according to an embodiment of the present invention.

In the following, the operation of the above-mentioned mobile communication system 10 will be described. Specifically, the operation till the UE300 and eNB100A establish radio communications based on a determined UE category will be described. FIG. 4 shows a communication sequence till the UE300 and eNB100A establish radio communications among the UE300, eNB100A and MME200.

The UE300 and eNB100A transmit and receive information for connecting the eNB100A by using a random access channel (RACH) (S10, S20).

Then, the UE300 and eNB100A transmit and receive "RRC CONNECTION REQUEST" and "RRC CONNECTION SETUP" in a radio resource control (RRC) layer and establish connections between the UE300 and eNB100A (S30, S40).

Upon receipt of "RRC CONNECTION SETUP COMPLETE" from the UE300, the eNB100A transmits "INITIAL UE MESSAGE" to the MME200, and the UE300 and MME200 perform authentication or security processing of non-access stratum (S50 to S70). Further, the MME200 transmits "INITIAL CONTEXT SETUP REQUEST" to the eNB100A (S80).

Here, in "INITIAL CONTEXT SETUP REQUEST", if a UE category (UE Capability) to be applied to radio communications with the UE300 and eNB100A is not notified, the eNB100A acquires a UE category from the UE300 (S90 to S110). Specifically, the eNB100A transmits "UE CAPABILITY ENQUIRY" to the UE300, and the UE300 notifies the eNB100A of a UE category to be applied to radio communications with the eNB100A by using "UE CAPABILITY INFORMATION". Using "UE CAPABILITY INFO INDICATION", the eNB100A notifies the MME200 of the UE category notified by the UE300. Note that such a communication sequence is provided in the LTE.

Then, the eNB100A transmits "SECURITY MODE COMMAND" requesting encryption or integrity protection to the UE300 (S120). Further, the eNB100A transmits "RRC CONNECTION RECONFIGURATION" to the UE300 and configures a connection to be used in radio communications with the UE300.

By including in "RRC CONNECTION RECONFIGURATION" a UE category determined to be applied to radio communications with the UE300, the eNB100A notifies the UE300 of the UE category.

Here, the eNB100A may directly determine the UE category notified by the UE300 in step S100 as a UE category to be used in radio communications with the UE300. Alternatively, the eNB100A may determine the UE category included in "INITIAL CONTEXT SETUP REQUEST" notified by the MME200 in step S80 as a UE category to be applied to radio communications with the UE300.

Further, in steps S90 to S110 (those within the dotted frame in the figure), based on a plurality of UE category candidates (UE category 5 and UE category 6, for example) of which the UE300 notifies the eNB100A, the UE300 and eNB100A may assume that of the UE category candidates, the lower UE category (UE category 5) is a UE category to be applied to radio communications with the UE300, and perform radio communications based on the assumed UE category. Specifically, the UE300 and eNB100A may perform radio communications based on a predetermined UE category, specifically, the lower UE category, of the UE category candidates till the eNB100A notifies the UE300 of the UE category.

In this case, if each of the UE300 and eNB100A supports Release 10 of LTE, and radio communications based on the UE category 6 is possible, in step S130, the UE category to be applied is changed from the UE category 5 to the UE category 6.

(4) Example of Operation and Effect

With the mobile communication system 10 described above, the eNB100A (100B) notifies the UE300 of a UE category determined by the category determination unit 140.

Thus, the UE300 can perform radio communications with the eNB100A based on the determined UE category. Specifically, even if a method of rate matching differs for each UE category, the UE300 can correctly demodulate user data from a radio signal transmitted from the eNB100A.

Further, even if the UE300 supports Release 10 of LTE and the eNB100A does not support Release 10, for example, the UE300 can correctly demodulate the user data from the radio signal transmitted from the eNB100A because it is notified of the UE category by the eNB100A.

In this embodiment, a UE category is determined based on a UE category acquired from the UE300 which connects to the eNB100A or MME200 positioned above the eNB100A. Thus, an appropriate UE category depending on capability of the UE300 can be selected.

In the embodiment, for a period till the eNB100A notifies the UE300 of a UE category based on the UE category notified by the eNB100A (the category notification unit 150), a lower GE category of UE category candidates acquired by the eNB100A (the category acquisition unit 130) is determined as a UE category to be applied to radio communications with the UE300. Further, in the embodiment, for a period till the eNB100A notifies the UE300 of a UE category based on the UE category notified by the eNB100A (the category notification unit 150), data can be transmitted to the UE300 by using transport block size for which a method of rate matching is the same, of the UE category candidates.

Thus, even if either UE300 or eNB100A supports a higher UE category, the UE300 and eNB100A can correctly demodulate user data and promptly establish radio communications without exchanging information on the UE category.

(5) Modification

In the embodiment described above, it was assumed that based on the plurality of UE category candidates of which the UE300 notifies the eNB100A, the UE category with lower capability of the UE category candidates was assumed as the UE category to be applied to radio communications with the UE300. However, the UE300 may use an existing signal which the eNB100A transmits to the UE300 to determine a UE category which the UE300 assumes in rate matching.

FIG. 7(*a*) and FIG. 7(*b*) show a functional block configuration of the category determination unit 140 of the eNB100A and the category determination unit 330 of the UE300 according to the modification. As shown in FIG. 7(*a*), the category determination unit has a maximum spatial layer count acquisition function, a codebook subset restriction signal generation function, and a rate matching parameter determination function. The category determination unit 330 has the codebook subset restriction signal generation function, the maximum spatial layer count determination function, and the rate matching parameter determination function.

In the modification, based on information on the maximum spatial layer count of which the eNB100A notifies the UE300, the UE300 determines a UE category which it assumed in the rate matching.

First, "maximum spatial layer count" shown in FIG. 6 will be described. This is the maximum spatial layer count supported by the UE300 in each UE category. Numeric values for the UE categories 1 to 5 are provided in Release 8.

Although no maximum spatial layer count is provided in the UE categories 6 to 8 newly added in Release 10, it is provided that the UE300 notifies the eNB100A of the maximum spatial layer count for each frequency band. Further, the UE300 which supports Release 10 can also overwrite the maximum spatial layer count for the UE categories 1 to 5.

Further, the functions which have been already supported in Release 8 include the codebook subset restriction. Using this function, the eNB100A can specify a codebook element which the UE300 uses to select CQI (channel quality information), PMI (precoding matrix indicator), or RI (Rank indicator). For example, in signaling of the codebook subset restriction, by causing the eNB100A to specify only a codebook element of rank 1 and rank 2, the UE300 feeds back corresponding CQI and PMI only for the rank 1 or rank 2 to the eNB100A. Specifically, the eNB100A can notify the UE300 of the maximum spatial layer count to be used in transmission, by using signaling of the codebook subset restriction.

The operation of the UE300 supporting Release 10, which notifies the eNB100A of the UE category 6 and UE category 4 based on the assumption that such eNB100A can notify the maximum spatial layer count, will be described.

Here, it is assumed that the UE300 notifies "4", the maximum spatial layer count to be supported in the UE category 6. According to the specification shown in FIG. 6, in the case of the UE category 6, the number of soft channel bits is 3667200. On the one hand, the number of soft channel bits for the UE category 4 is 1827072, and a method of rate matching differs. When handling the UE300 as the UE category 6, the eNB100A notifies the UE300 of possibility of transmission of up to 4 layers by specifying codebook elements to the rank 4 for signaling of the codebook subset restriction.

Upon receipt of the codebook subset restriction, the UE300 acquires the maximum spatial layer count "4" which can be supported. Since the value is greater than the maximum spatial layer count "2" provided in the UE category 4, it is determined as a UE category to which the UE category 6 should be applied, and determines a parameter of rate matching.

As shown in FIG. 7, the eNB100A acquires information on the UE categories and that on the maximum spatial layer count supported by UE300. The eNB100A determines the maximum spatial layer count to be used in transmission with the UE300, and reflects the determined maximums spatial layer count in the codebook subset restriction. Simultaneously, the eNB100A determines the parameter of rate matching based on the maximum spatial layer count.

The UE300 receives the codebook subset restriction. The codebook subset restriction can be communicated in "RRC CONNECTION RECONFIGURATION" transmitted from eNB100A. The UE300 acquires the maximum spatial layer count of a signal to be transmitted by the eNB100A from the information it received. If the acquired maximum spatial layer count is greater than the maximum spatial layer count (2) provided in the UE category (UE category 4) with lower capability (communication rate, for example), the UE300 applies a parameter of rate matching provided in the UE category (UE category 6) with higher capability. In any case other than this, UE300 applies a parameter of rate matching of the category with lower capability. If the Codebook subset restriction is not applied, a parameter of rate matching according to the UE category with lower capability is applied.

Further, in some cases, a parameter of rate matching may differ depending on a component carrier count even in a same UE category. In this case, the eNB100A may determine a parameter of rate matching by further considering a component carrier count to be notified by the eNB100A. Specifically, the UE300 can determine a parameter of rate matching based on the maximum spatial layer count based on the codebook subset restriction, and the component carrier count.

Specifically, based on at least any of the maximum spatial layer count and the component carrier count transmitted from the eNB100A, the category determination unit 140 of the UE300 according to the modification determines a parameter of rate matching to be applied to radio communications with the eNB100A and determines a UE category which uses the determined parameter as a UE category to be applied to radio communications with the eNB100A.

Further, in the case in which two types of UE categories are notified by the eNB100A, if the maximum spatial layer count provided in the UE category with lower capability is greater than the maximum spatial layer count transmitted from the eNB100A, the category determination unit determines the UE category with higher capability as a UE category to be applied to radio communications with the eNB100A. If the maximum spatial layer count provided in the UE category with lower capability is not greater than the maximum spatial layer count transmitted from the eNB100A, the category determination unit determines the UE category with lower capability as a UE category to be applied to radio communications with the eNB100A.

In addition, as described above, the maximum spatial layer count is acquired based on information contained in the codebook subset restriction.

Note that any method other than the above-mentioned modification includes use of a parameter of rate matching of a UE category supporting a release of standards of the radio communications (LTE of 3GPP, for example) which defines a control signal containing a transmission mode for the eNB100A to notify.

In Release 8 of the LTE, a control signal referred to as transmissionMode is defined for notification of the transmission mode from the eNB100A to the UE300. On the one hand, in Release 10, transmissionMode-r10 is defined for notification of the transmission mode. As with the modification described above, if it is notified of a transmission mode by the eNB100A through the use of transmissionMode-r10, the UE300 supporting Release 10 which notifies the eNB100A of the category 6 and the category 4 applies a rate matching a parameter of the UE category defined in Release 10, that is to say, the UE category 6. Specifically, the UE300 applies, to radio communications with the radio base station, a parameter of rate matching of a mobile station category corresponding to the release of standards of the radio communications which defines a control signal notifying a transmission mode of radio communications.

Further, the UE300 (the radio communication unit 310 decodes a received signal based on soft buffer size corresponding to the determined UE category.

(6) Other Embodiments

As described above, while content of the present invention has been disclosed through one embodiment of the present invention, it should not be appreciated that discussion and drawings which form a part of the disclosure limit the present invention. Various alternative embodiments will be apparent to those who skilled in the art from the disclosure.

For example, in the embodiment described above, the eNB determines a UE category to be applied to radio communications with the UE300 and notifies the UE300 of the determined UE category. Alternatively, the MME200, in place of the eNB100A, may include functions which correspond to the category determination unit 140 and the category notification unit 150 of the eNB100A.

In the embodiment described above, while the description is provided with the Release 8, 9 of the LTE or Release 10 as an example, the present invention can be similarly applied to any radio communication system as far as a plurality of mobile station (UE) categories are provided for it.

Further, the UE categories shown in FIG. 6 are one example based on Release 10 (TS36.306) of the LTE, and shall not limit any scope of the present invention.

As such, it is needless to say that the present invention contains various embodiments which are not described herein. Therefore, the technical scope of the present invention shall only be defined by particular inventive matters according to the claims which are reasonable from the above description.

Note that Japanese Patent Application No. 2011-103303 (filed on May 2, 2011) and Japanese Patent Application No. 2011-104655 (filed on May 9, 2011) are incorporated herein by reference in their entirety.

INDUSTRIAL APPLICABILITY

According to characteristics of the present invention, data can be correctly demodulated based on mobile station categories.

EXPLANATION OF THE REFERENCE NUMERALS

10 mobile communication system
50 core network
100A, 100B radio base station (eNB)
110 radio communication unit
120 network interface unit
130 category acquisition unit
140 category determination unit
150 category notification unit
200 MME
300 mobile station (UE)
310 radio communication unit
320 category notification unit
330 category determination unit

The invention claimed is:

1. A radio base station comprising:
    a category acquisition unit configured to acquire one or more mobile station categories indicating capability of a mobile station with which to communicate;
    a category determination unit configured to determine a mobile station category to be applied to radio communications with the mobile station, from the mobile station categories acquired by the category acquisition unit to correspond with one of parameters used in rate matching processing of the mobile station; and
    a category notification unit configured to notify the mobile station of the mobile station category determined by the category determination unit, wherein
    the category determination unit determines to transmit data to the mobile station by using transport block size for which a method of the rate matching is the same, of candidates for the mobile station categories acquired by the category acquisition unit, until the mobile station is notified of the mobile station category by the radio base station.

2. The radio base station according to claim 1 wherein the category acquisition unit acquires one or more mobile station categories from the mobile station.

3. The radio base station according to claim 1 wherein the category determination unit acquires one or more mobile station categories, from a communication controller positioned above the radio base station.

4. A mobile station configured to perform radio communications with a radio base station, based on any mobile station category determined from a plurality of mobile station categories, the mobile station comprising a category determination unit configured to determine a parameter of rate matching to be applied to radio communications with the radio base station based on at least any of a maximum spatial layer count and a component carrier count transmitted from the radio base station, and to determine a mobile station category which uses the determined parameter, as a mobile station category to be applied to radio communications with the radio base station.

5. The mobile station according to claim 4, wherein if two types of mobile station categories are notified by the radio base station, the category determination unit:

determines a mobile station category with higher capability as a mobile station category to be applied to radio communications with the radio base station when the maximum spatial layer count provided in a mobile station category with lower capability is greater than the maximum spatial layer count transmitted from the radio base station, and determines the mobile station category with lower capability as the mobile station category to be applied to radio communications with the radio base station when the maximum spatial layer count provided in the mobile station category with lower capability is not greater than the maximum spatial layer count transmitted from the radio base station.

6. The mobile station according to claim 4 wherein the maximum spatial layer count is acquired based on information contained in codebook subset restriction.

7. A mobile station configured to perform radio communications with a radio base station, based on any of mobile station categories determined from a plurality of mobile station categories, the mobile station applying to radio communications with the radio base station a parameter of rate matching of a mobile station category supporting release of standards of the radio communications which define a control signal notifying a transmission mode of the radio communications.

8. The mobile station according to claim 7, configured to decode a received signal, based on soft buffer size correspond to the determined mobile station category.

9. A communication controller, comprising:

a category acquisition unit configured to acquire one or more mobile station categories indicating capability of a mobile station with which to communicate;

a category determination unit configured to determine a mobile station category to be applied to radio communications with the mobile station, from mobile station categories acquired by the category acquisition unit, to correspond to one of parameters to be used in rate matching processing of the mobile station; and a category notification unit configured to notify the mobile station of the mobile station category determined by the category determination unit, wherein the category determination unit determines to transmit data to the mobile station by using transport block size for which a method of the rate matching is the same, of candidates for the mobile station categories acquired by the category acquisition unit, until the mobile station is notified of the mobile station category by the controller.

10. A communication control method, comprising the steps of:

acquiring one or more mobile station categories indicating capability of a mobile station with which to communicate;

determining a mobile station category to be applied to radio communications with the mobile station, from the acquired mobile station categories, to correspond to one of parameters used in rate matching processing of the mobile station; and notifying the mobile station of the determined mobile station category, wherein in the determining step, a radio base station determines to transmit data to the mobile station by using transport block size for which a method of the rate matching is the same, of candidates for the mobile station categories acquired by the acquiring step, until the mobile station is notified of the mobile station category by the radio base station.

* * * * *